(12) United States Patent
Terashima et al.

(10) Patent No.: US 12,291,836 B2
(45) Date of Patent: May 6, 2025

(54) ELECTRICALLY POWERED CONSTRUCTION MACHINE

(71) Applicant: Yanmar Power Technology Co., Ltd., Osaka (JP)

(72) Inventors: Jun Terashima, Fukuoka (JP); Kensuke Kaneda, Fukuoka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 782 days.

(21) Appl. No.: 17/416,458

(22) PCT Filed: Nov. 20, 2019

(86) PCT No.: PCT/JP2019/045415
§ 371 (c)(1),
(2) Date: Jun. 18, 2021

(87) PCT Pub. No.: WO2020/129524
PCT Pub. Date: Jun. 25, 2020

(65) Prior Publication Data
US 2022/0074163 A1 Mar. 10, 2022

(30) Foreign Application Priority Data
Dec. 19, 2018 (JP) .................. 2018-237019

(51) Int. Cl.
*E02F 3/32* (2006.01)
*B60K 1/04* (2019.01)
(Continued)

(52) U.S. Cl.
CPC ............... *E02F 3/325* (2013.01); *B60K 1/04* (2013.01); *B60L 50/40* (2019.02); *B60L 50/50* (2019.02); *B60L 53/00* (2019.02); *B60L 55/00* (2019.02); *E02F 9/0858* (2013.01); *E02F 9/207* (2013.01); *E02F 9/2091* (2013.01)

(58) Field of Classification Search
CPC ......... E02F 3/325; E02F 9/0858; E02F 9/207; E02F 9/2091; B60K 1/04; B60K 2001/0438; B60K 2001/045; B60L 50/40; B60L 50/50; B60L 53/00; B60L 55/00; B60L 50/53; B60L 58/18; B60L 58/00;
(Continued)

(56) References Cited

U.S. PATENT DOCUMENTS

| 2012/0220420 A1* | 8/2012 | Ohno | E02F 9/2075 180/65.265 |
| 2013/0200846 A1* | 8/2013 | Ang | B60L 1/003 320/109 |
| 2013/0304332 A1* | 11/2013 | Kim | E02F 9/2091 701/50 |

FOREIGN PATENT DOCUMENTS

| JP | 3838679 B | 7/2006 |
| JP | 2011-103720 A | 5/2011 |
| JP | 6420120 B | 10/2018 |

* cited by examiner

*Primary Examiner* — Lincoln D Donovan
*Assistant Examiner* — Alex W Lam
(74) *Attorney, Agent, or Firm* — Chris Mizumoto

(57) ABSTRACT

A hydraulic shovel is provided with a lower travelling body and an upper revolving body revolvably disposed on the lower travelling body. The hydraulic shovel is also provided with a motor disposed on the upper revolving body for driving the hydraulic shovel, a first battery unit disposed on the upper revolving body, a second battery unit disposed on the lower travelling body, and a power supplier that supplies external power to the first battery unit and the second battery unit.

6 Claims, 4 Drawing Sheets

(51) Int. Cl.
*B60L 50/40* (2019.01)
*B60L 50/50* (2019.01)
*B60L 53/00* (2019.01)
*B60L 55/00* (2019.01)
*E02F 9/08* (2006.01)
*E02F 9/20* (2006.01)

(58) Field of Classification Search
CPC .......... B60Y 2200/25; B60Y 2200/412; Y02T 10/70; Y02T 10/7072; Y02T 90/14
See application file for complete search history.

ELECTRICALLY POWERED CONSTRUCTION MACHINE

CROSS-REFERENCE

This application is a US National Stage Application under 35 U.S.C. § 371 of International Application No. PCT/JP2019/045415 filed Nov. 20, 2019 which claims foreign priority of JP2018-237019 filed Dec. 19, 2018, the disclosures of which are hereby incorporated by reference in their entirety.

TECHNICAL FIELD

The present invention relates to an electrically powered construction machine.

BACKGROUND ART

The following patent Literature 1 discloses an electrically powered work vehicle in which a revolving body is revolvably located on a traveling device and a battery is located at the rear of the revolving body. The following patent Literature 2 discloses a battery-driven construction machine in which a battery unit is attached in a lower space between a pair of crawlers of a lower traveling body.

CITATION LIST

Patent Literature

Patent Literature 1: Japanese Patent Unexamined Publication No. 2013-139676
Patent Literature 2: Japanese Patent Unexamined Publication No. 2005-289181

DISCLOSURE OF INVENTION

Problems to be Solved by the Invention

In the electrically powered work vehicle of the Patent Literature 1, when desiring to increase a battery capacity, it is necessary to stack batteries in the upper direction. There is, however, a problem of a lack of stability due to stacking batteries leading to a raised position of the center of gravity.

Furthermore, in the battery-driven construction machine of Patent Literature 2, by locating a battery unit on a lower traveling body, the position of the center of gravity as a whole can be lowered and thus the attitude can be stabilized. However, the battery capacity, which is increasable, is limited because the battery unit is located in the lower space between a pair of crawlers.

Therefore, in light of the above described problems, it is an object of the present invention to provide an electrically powered construction machine capable of improving the stability of the machine while increasing the battery capacity.

Means for Solving the Problems

The electrically powered construction machine according to the present invention, which includes a lower traveling body and an upper revolving body revolvably mounted on the lower traveling body, is provided with: an electric motor disposed on the upper revolving body for driving the electrically powered construction machine; a first electrical storage device disposed on the upper revolving body; a second electrical storage device disposed on the lower traveling body; and a feeder device for externally supplying electric power to the first electrical storage device and the second electrical storage device.

According to the present invention, by mounting a power storage on the lower traveling body and the upper revolving body separately, it is possible to improve the stability of the machine while increasing the battery capacity.

DESCRIPTION OF EMBODIMENTS

Figure 1:
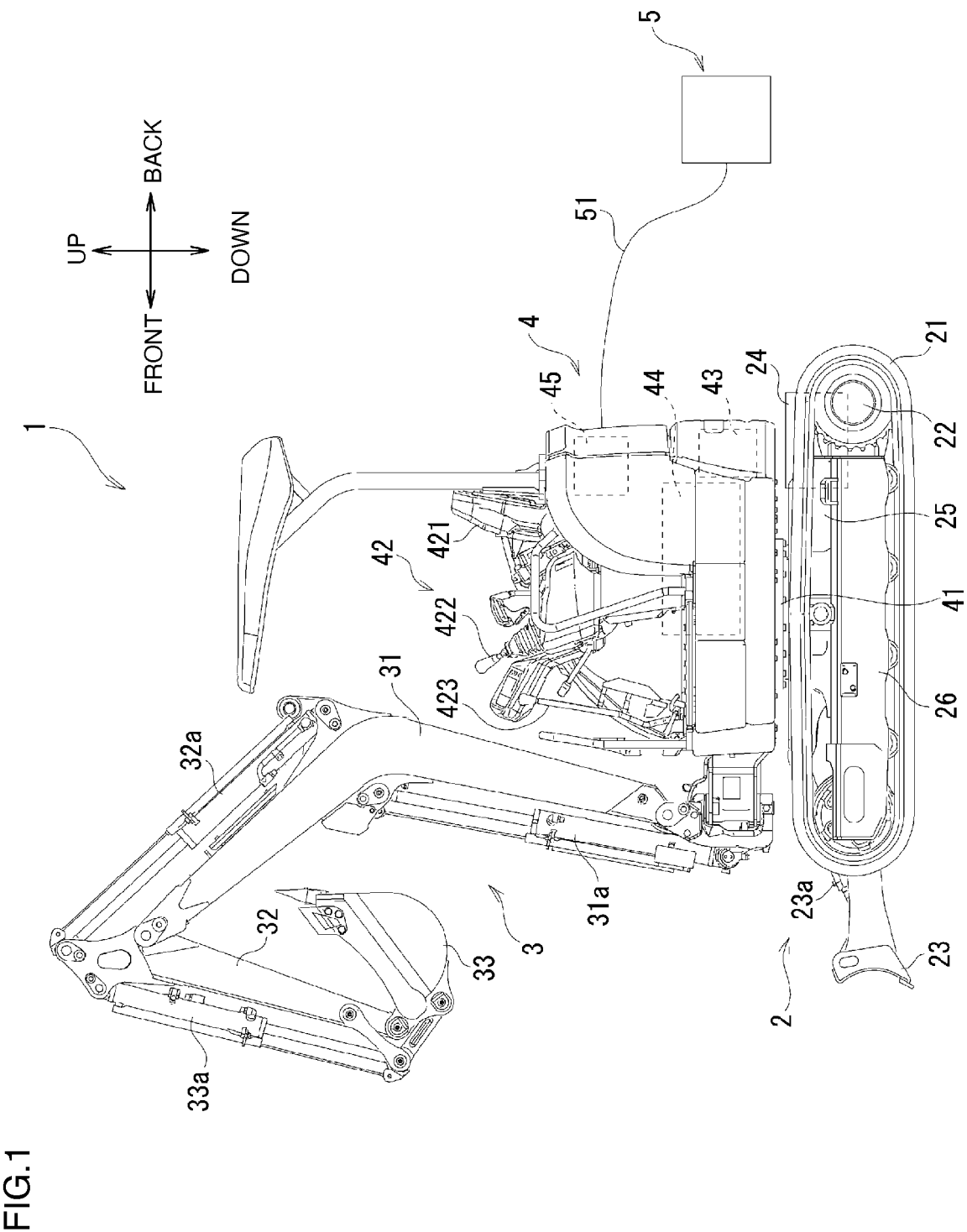
FIG. 1 is a side view illustrating the electrically powered construction machine according to the present embodiment.
Figure 2:
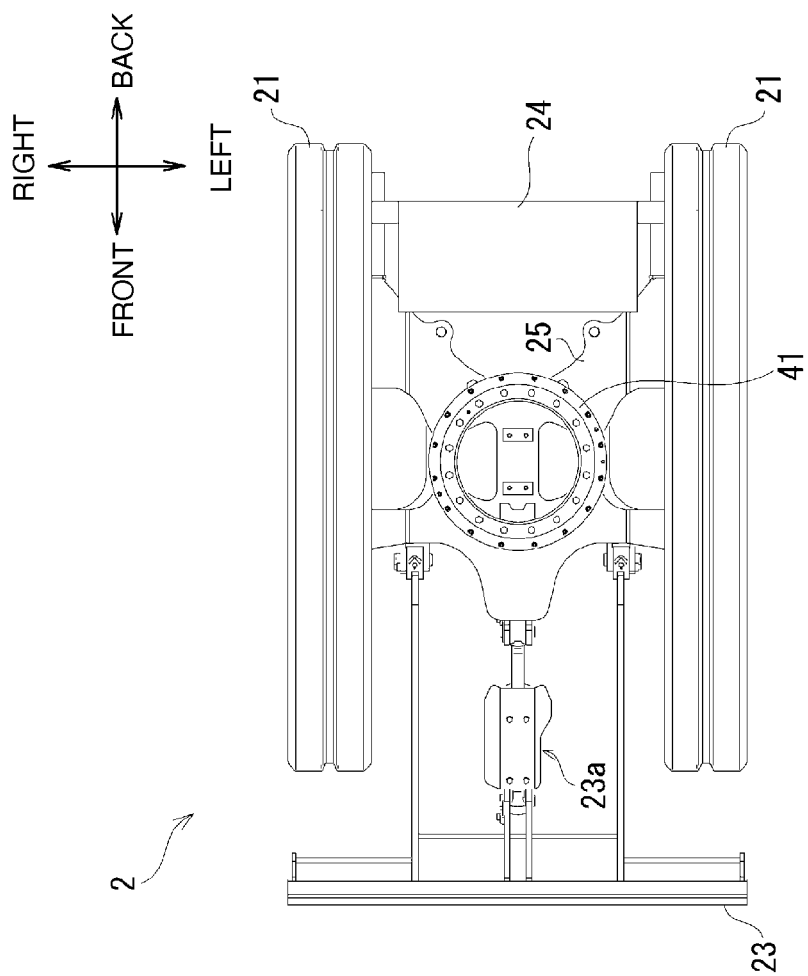
FIG. 2 is a plan view of the lower traveling body.

Now, embodiments of the present invention will be described below with reference to the drawings.
[Configuration of Electrically Powered Construction Machine]
First of all, with reference to FIG. 1, a schematic structure of a hydraulic shovel 1 as an example of the electrically powered construction machine will be described. However, the electrically powered construction machine is not limited to the hydraulic shovel. 1, and may be another vehicle such as a wheel loader, and the like. The hydraulic shovel 1 includes a lower traveling body 2, a working machine 3, and an upper revolving body 4.

The lower traveling body 2 includes a left-and-right pair of crawlers 21, 21 and a left-and-right pair of traveling electric motors 22, 22. The constitution that the left-and-right traveling electric motors 22, 22 drive the left-and-right crawlers 21, 21 respectively enables the hydraulic shovel 1 to move forward and backward. Furthermore, the lower traveling body 2 is provided with a blade 23 and a blade cylinder 23a which is a hydraulic cylinder for rotating the blade 23 in the vertical direction.

The working machine 3 includes a boom 31, an arm 32, and a bucket 33, and is capable of an excavation work of earth and sand by driving these independently. The boom 31, the arm 32, and the bucket 33 correspond to working parts; respectively; and the hydraulic shovel 1 includes a plurality of working parts.

The boom 31 is revolved by a boom cylinder 31a whose base end portion is supported by a front portion of the upper revolving body 4 and which is movable freely in an expanded or a contracted way. Furthermore, the arm 32 is revolved by an arm cylinder 32a whose base end portion is supported by a tip portion of the boom 31 and which is movable freely in an expanded and a contracted way. Moreover, the bucket 33 is revolved by a bucket cylinder 33a whose base end portion is supported by a tip portion of the arm 32 and which is movable freely in an expanded or a contracted way. Each of the boom cylinder 31a, the arm cylinder 32a, and the bucket cylinder 33a is composed of a hydraulic cylinder.

The upper revolving body 4 is configured to be revolvable with respect to the lower traveling body 2 via a revolving bearing 41. There are arranged on the upper revolving body 4 a steering portion 42, a revolving motor (not shown), a motor 43 (corresponding to an electric motor), a first battery unit 44 (corresponding to a first electrical storage device), and a power supplier 45 (corresponding to a feeder device). The upper revolving body 4 revolves via the revolving bearing 41 by means of a driving force of the revolving motor. In addition, there are arranged on the upper revolving body 4 a plurality of hydraulic pumps (not shown in FIG. 1) driven by the motor 43. These hydraulic pumps supply pressure oil to each hydraulic actuator (i.e., the blade cylinder 23a, the boom cylinder 31a, the arm cylinder 32a, and the bucket cylinder 33a, the revolving motor, etc.). Besides, the power supplier 45 may be disposed on the lower traveling body 2.

A driver's seat 421 is positioned in the steering portion 42. A pair of work operation levers 422, 422 are arranged on the left and right sides of the driver's seat 421, as well as a pair of traveling levers 423, 423 are arranged in front of the driver's seat 421. An operator can control each hydraulic actuator with sitting on the driver's seat 421 by operating the work operation levers 422, 422, the traveling levers 423, 423, etc. to perform traveling, revolving, working, and the like.

The upper revolving body 4 is provided with a power supply port (not shown), and by connecting a feeder cable 51 of a commercial power supply 5 (corresponding to an external power supply) to the power supply port, the commercial power supply 5 can be connected to the power supplier 45.

A second battery unit 24 (corresponding to a second electrical storage device) is disposed on the lower traveling body 2. The second battery unit 24 is located in the rear of the revolving bearing 41 and between the left-and right pair of crawlers 21, 21. The second battery unit 24 is fixed to a center frame 25 located at the center of the lower traveling body 2 and a left-and right pair of side frames 26, 26 located on the sides of the center frame 25.

[Configuration of Power Supply System]

Figure 3:
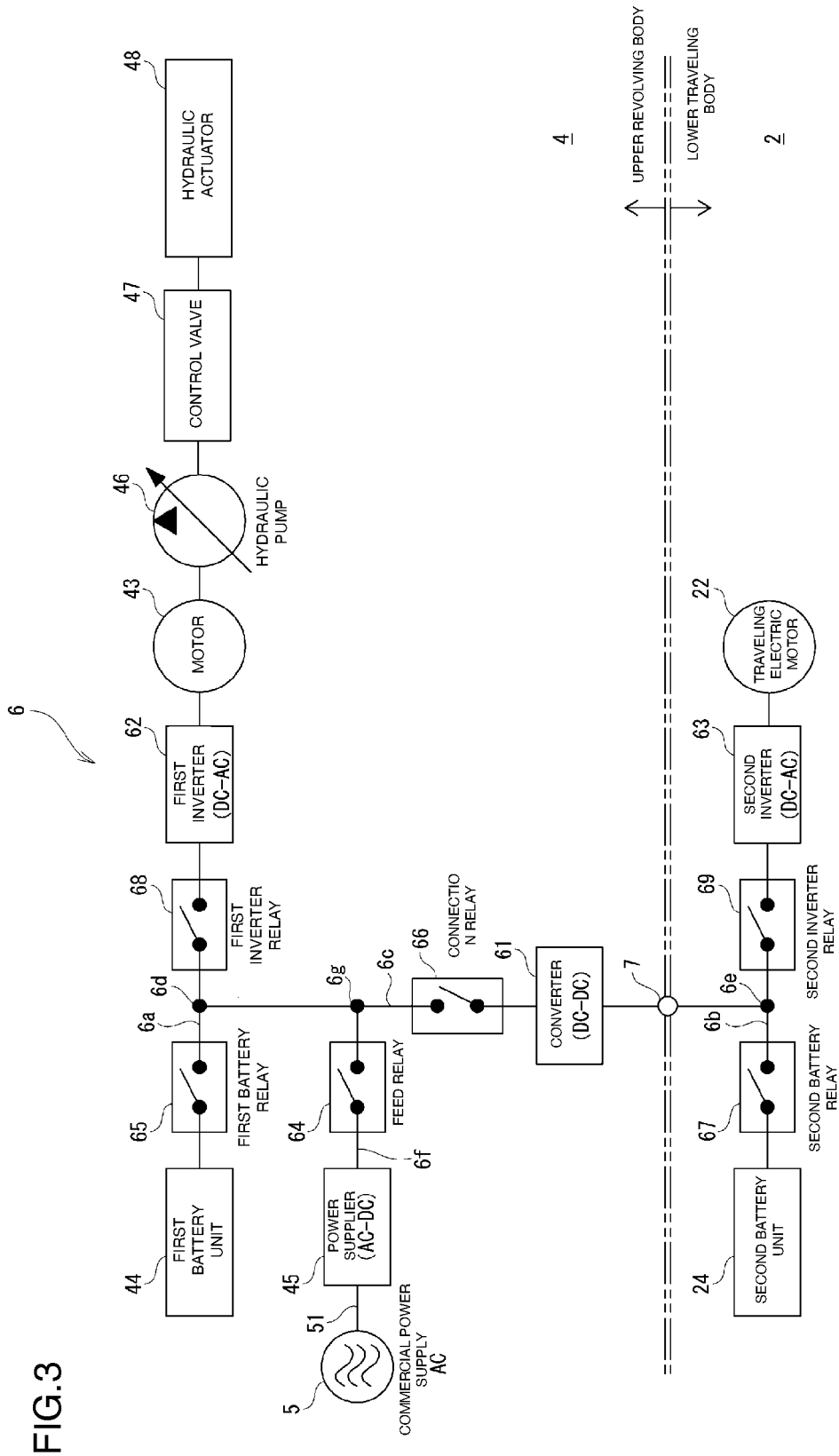
FIG. 3 is a block diagram of a power supply system to be mounted on the electrically powered construction machine.
Figure 4:
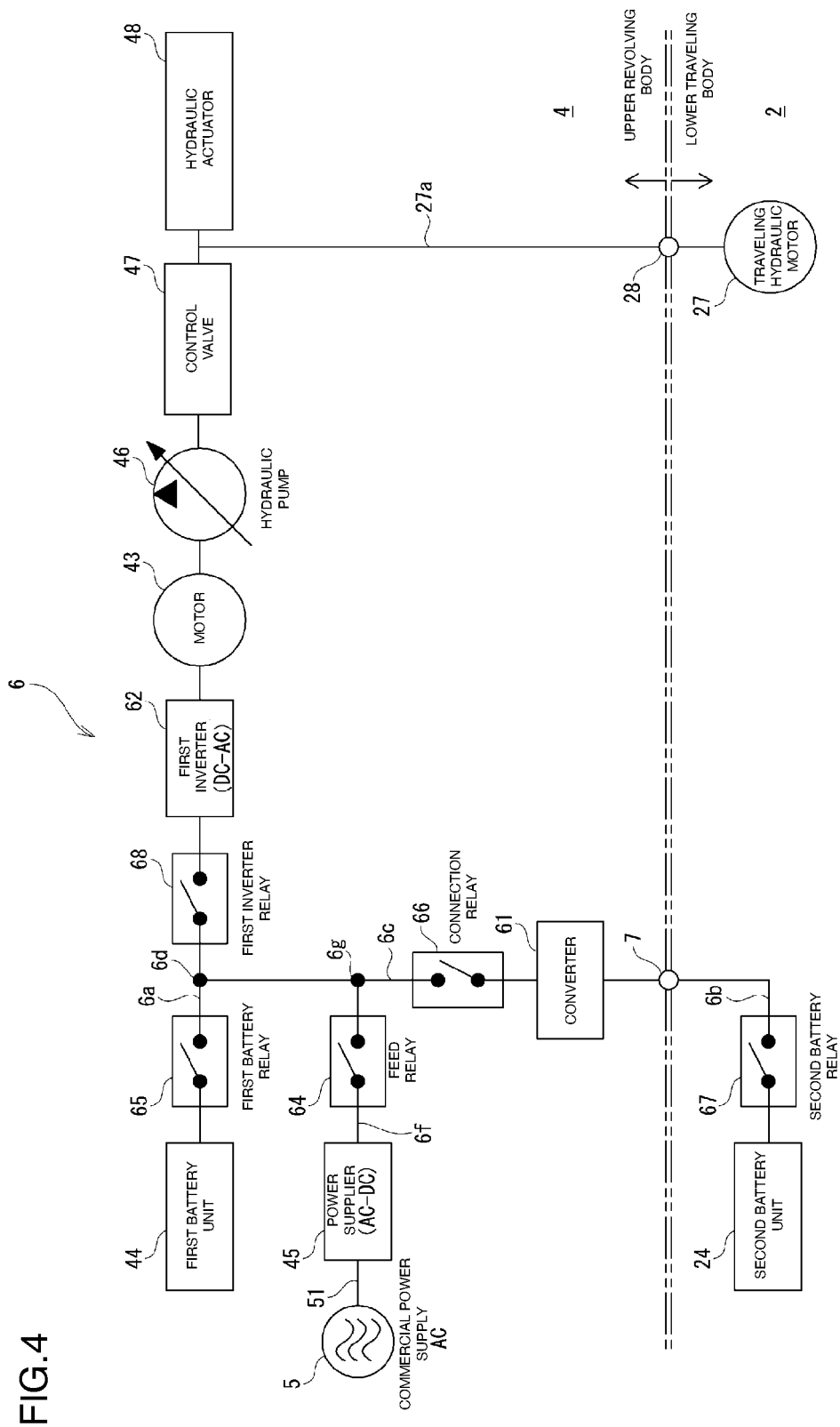
FIG. 4 is a block diagram of the power supply system according to an alternative embodiment.

With reference to FIG. 3, a power supply system 6, which is mounted on the hydraulic shovel 1 and supplies electric power to the motor 43 and the traveling electric motor 22, will be described below. The power supply system 6 includes the power supplier 45 which converts an AC power supply voltage of the commercial power supply 5 into a DC power supply voltage, and the first battery unit 44 and the second battery unit 24 that charge or discharge the electric power from the power supplier 45.

The power supply system 6 further includes a first electric path Ga disposed on the upper revolving body 4 and leads from the first battery unit 44 to the motor 43, a second electric path Gb disposed on the lower traveling body 2 and leads from the second battery unit 24, a connection electric path 6c connecting the first electric path 6a and the second electric path Gb, a converter 61 (corresponding to a voltage converting device) located on the connection electric path 6c, and a first inverter 62 and a second inverter 63 that convert the DC power supply voltage into the AC power supply voltage. The connection electric path 6c connects with the first electric path Ga at a first connection point 6d, and connects with the second electric path Gb at a second connection point Ge.

The power supplier 45 converts the AC voltage supplied from the commercial power supply 5 via the feeder cable 51 into the DC voltage. A third electric path 6f leading from the power supplier 45 connects with the connection electric path 6c at a third connection point 6g, A feed relay 64 is located between the power supplier 45 and the third connection point 6g. The DC voltage of the power supplier 45 is supplied to the first battery unit 44 via the feed relay 64 and the first battery relay 65, so that the first battery unit 44 is charged. Furthermore, the DC voltage of the power supplier 45 is supplied to the second battery unit 24 via the feed relay 64, a connection relay 66, the converter 61, and a second battery relay 67, so that the second battery unit 24 is charged. Moreover, the DC voltage of the power supplier 45 may be supplied to the first inverter 62 via the feed relay 64 and a first inverter relay 68.

The first battery unit 44 supplies the DC voltage to the first inverter 62 via a first battery relay 65 and the first inverter relay 68. The first battery relay 65 is located between the first battery unit 44 and the first connection point Gd. Furthermore, the first inverter relay 68 is located between the first inverter 62 and the first connection point Gd. Moreover, the first battery unit 44 can supply the DC voltage to the second electric path Gb via the connection electric path 6c.

The second battery unit 24 supplies the DC voltage to the second inverter 63 via the second battery relay 67 and a second inverter relay 69. The second battery relay 67 is located between the second battery unit 24 and the second connection point Ge. Furthermore, the second inverter relay 69 is located between the second inverter 63 and the second connection point Ge. Moreover, the second battery unit 24 can supply the DC voltage to the first electric path Ga via the connection electric path Ge.

The first battery unit 44 and the second battery unit 24 store one or more batteries, the battery capacity is appropriately determined depending on a number of batteries stored therein. Examples of the battery include a lithium ion battery.

The first inverter 62 converts the DC voltage supplied from the first battery unit 44 and/or the second battery unit 24 into the AC voltage. The AC voltage is supplied to the motor 43. The motor 43 causes a hydraulic pump 46 to work. Besides, although FIG. 3 shows only the hydraulic pump 46, a plurality of hydraulic pumps may be provided. The hydraulic pump 46 supplies pressure oil to each hydraulic actuator 48 (i.e., the boom cylinder 31a, the arm cylinder 32a, the bucket cylinder 33a, the revolving motor, etc.) via a control valve 47.

The second inverter 63 converts the DC voltage supplied from the second battery unit 24 and/or the first battery unit 44 into the AC voltage. The AC voltage is supplied to the traveling electric motor 22.

The converter 61 is a DC-DC converter to convert a voltage with a direct current. The converter 61 is located on the connection electric path 6c and controls a voltage value such that current passing through the converter 61 is less than a set threshold. By connecting the first electric path Ga and the second electric path Gb via the converter 61, even if a power consumption balance between the first battery unit 44 and the second battery unit 24 is significantly different, no large current flows in a circuit, and thus the circuit would never be damaged as well as parts procurement costs can be reduced because general-purpose parts are available.

Furthermore, the converter 61 can control a voltage ratio between the first electric path Ga and the second electric path Gb based on a set value. A setting of voltages of the first electric path Ga and the second electric path Gb is not conducted by setting those voltages to an identical voltage by matching the number of the batteries connected in series composing the first battery unit 44 and that of the second battery unit 24, but conducted by setting the voltage ratio between the first electric path Ga and the second electric path Gb by means of the converter 61, whereby a maximum possible number of batteries of the first battery unit 44 and the second battery unit 24 can be mounted on the first battery unit 44 and the second battery unit 24, respectively.

A slip ring 7 is arranged on the connection electric path 6c. The slip ring 7 is positioned inside a connecting portion between the lower traveling body 2 and the upper revolving body 4, specifically inside the revolving bearing 41. Furthermore, the slip ring 7 is located between the converter 61 and the second connection point Ge. No large current flows in the slip ring 7 connecting the first electric path Ga and the second electric path Gb because the first electric path Ga and the second electric path Gb are connected via the converter 61, whereby the increase of costs can be suppressed because a special type of slip ring is not necessary.

As described above, the hydraulic shovel 1 according to the present embodiment, which includes the lower traveling body 2 and the upper revolving body 4 revolvably mounted on the lower traveling body 2, is provided with: the motor 43 disposed on the upper revolving body 4 for driving the hydraulic shovel 1; the first battery unit 44 disposed on the upper revolving body 4; the second battery unit 24 disposed on the lower traveling body 2; and the power supplier 45 for externally supplying electric power to the first battery unit 44 and the second battery unit 24.

By mounting the batteries on the lower traveling body 2 and the upper revolving body 4 separately, it is possible to increase the stability of the machine while increasing the capacity of the battery.

In the present embodiment, the first electric path Ga disposed on the upper revolving body 4 and leading from the first battery unit 44 to the motor 43, the second electric path Gb disposed on the lower traveling body 2 and leading from the second battery unit 24, the connection electric path 6c for connecting the first electric path Ga and the second electric path Gb, and the converter 61 located on the connection electric path 6c are provided, and the converter 61 controls a voltage value such that the current passing through the converter 61 is less than the set threshold. By connecting the first electric path 6a and the second electric path Gb via the converter 61, even if a power consumption balance between the first battery unit 44 and the second battery unit 24 is significantly different, no large current flows in a circuit, and thus the circuit would never be damaged as well as parts procurement costs can be reduced because general-purpose parts are available.

In the present embodiment, the converter 61 controls the voltage ratio between the first electric path Ga and the second electric path Gb based on the set value. A setting of voltages of the first electric path Ga and the second electric path Gb is not conducted by setting those voltages to an identical voltage by matching the number of the batteries connected in series composing the first battery unit 44 and that of the second battery unit 24, but conducted by setting the voltage ratio between the first electric path 6a and the second electric path 6b by means of the converter 61, whereby a maximum possible number of batteries of the first battery unit 44 and the second battery unit 24 can be mounted on the first battery unit 44 and the second battery unit 24, respectively.

In the present embodiment, the traveling electric motor 22 disposed on the lower traveling body 2 and connected to the second electric path 6b is provided. Thereby, a power supply circuit of the upper revolving body 4 and that of the lower traveling body 2 can be operated independently, and thus even if the power supply circuit of the upper revolving body 4 is damaged, the hydraulic shovel 1 can be moved by means of only the power supply circuit of the lower traveling body 2. Furthermore, as the first battery unit 44 can cover only an electric power which the second battery unit 24 cannot cover among the power consumed by the traveling electric motor 22 of the lower traveling body 2, a current flowing from the first electric path 6a to the second electric path 6b can be lower, and thus the parts procurement costs can be reduced because the general-purpose parts are available.

In the present embodiment, the slip ring 7 arranged on the connection electric path 6c is provided, and the slip ring 7 is positioned inside the connecting portion between the lower traveling body 2 and the upper revolving body 4. No large current flows in the slip ring 7 connecting the first electric path 6a and the second electric path 613 because the first electric path 6a and the second electric path 6b are connected via the converter 61, whereby the increase of costs can be suppressed because a special type of slip ring is not necessary.

Alternative Embodiment

In the above described embodiment, the left-and-right crawlers 21, 21 are driven by the left-and-right traveling electric motors 22, 22, respectively, but the left-and-right crawlers 21, 21 may be driven by the left-and right traveling hydraulic motors 27, 27, respectively. The hydraulic pump 46 supplies the pressure oil to the traveling hydraulic motor 27. In such a case, a swivel joint 28 is provided in the middle of an oil path 27a connecting the control valve 47 and a traveling hydraulic motor 27. The swivel joint 28 is located between the lower traveling body 2 and the upper revolving body 4.

In the above described embodiment, the hydraulic actuators (the boom cylinder 31a, the arm cylinder 32a, and the bucket cylinder 33a) to which the pressure oil is supplied by means of the hydraulic pump 46 driven by the motor 43 cause working parts (the boom 31, the arm 32, and the bucket 33) to work, but the entire working parts may be motorized by providing a plurality of electric motors. In addition, the blade 23 and the revolving motor, and the like can also be motorized.

In the above described embodiment, although the power supplier 45 is disposed on the upper revolving body 4, the power supplier 45 may be disposed on the lower traveling body 2. In such a case, the power supply port to which the feeder cable 51 is connected is also provided on the lower traveling body 2. By disposing the power supplier 45 on the lower traveling body 2, it is possible to prevent the upper revolving body 4 from catching and tangling up the feeder cable 51 when it is revolving. On the other hand, by disposing the power supplier 45 on the upper revolving body 4, it is possible to prevent the crawler 21 from trampling the feeder cable 51.

Although the embodiments according to the present invention have been described with reference to the drawings, it should be considered that a specific configuration is not limited to the embodiments. The scope of the invention is clearly shown by the claims as well as the description of the embodiments described above, and encompass any modifications or changes within the meaning and range equivalent to the claims.

DESCRIPTION OF REFERENCE NUMERALS

1 Hydraulic shovel
2 Lower traveling body
4 Upper revolving body
5 Commercial power supply
6a First electric path 6b Second electric path
6c Connection electric path
7 Slip ring
22 Traveling electric motor
24 Second battery unit
41 Revolving bearing
43 Motor
44 First battery unit
45 Power supplier

The invention claimed is:

1. An electrically powered construction machine which includes a lower traveling body and an upper revolving body revolvably mounted on the lower traveling body, comprising:
   an electric motor disposed on the upper revolving body for driving the electrically powered construction machine;
   a first electrical storage device disposed on the upper revolving body;
   a second electrical storage device disposed on the lower traveling body;
   a slip ring is positioned inside a connecting portion between the lower traveling body and the upper revolving body; and
   a feeder device disposed on the upper revolving body for externally supplying electric power to the first electrical storage device, and the feeder device supplying electric power to the second electrical storage device via the slip ring.

2. The electrically powered construction machine according to claim 1 further comprising:
   a first electric path disposed on the upper revolving body and leading from the first electrical storage device to the electric motor;
   a second electric path disposed on the lower traveling body and leading from the second electrical storage device;
   a connection electric path for connecting the first electric path and the second electric path; and
   a voltage converting device located on the connection electric path,
   wherein the voltage converting device controls a voltage value such that current passing through the voltage converting device is less than a set threshold.

3. The electrically powered construction machine according to claim 2, wherein the voltage converting device controls a voltage ratio between the first electric path and the second electric path based on a set value.

4. The electrically powered construction machine according to claim 2 further comprising a traveling electrically powered motor disposed on the lower traveling body and connected to the second electric path.

5. An electrically powered construction machine including
   a lower traveling body and an upper revolving body arranged to be freely revolving on the lower traveling body, comprising:
   an electric motor arranged on the upper revolving body for driving the electric construction machine;
   an electric motor for traveling arranged on the lower traveling body;
   a first power storage device arranged on the upper revolving body and supplying power to the electric motor;
   a second power storage device arranged on the lower traveling body and supplying power to the electric motor for traveling;
   a slip ring is positioned inside a connecting portion between the lower traveling body and the upper revolving body; and
   a power supply device for supplying power from an external source to the first power storage device and the second power storage device.

6. An electrical construction machine according to claim 5, wherein the power supply device is disposed on the upper revolving body.

* * * * *